(12) United States Patent
Zhao

(10) Patent No.: US 10,599,149 B2
(45) Date of Patent: Mar. 24, 2020

(54) SALIENT FEATURE BASED VEHICLE POSITIONING

(71) Applicant: SZ DJI TECHNOLOGY CO., Ltd, Shenzhen (CN)

(72) Inventor: Cong Zhao, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 55 days.

(21) Appl. No.: 15/404,038

(22) Filed: Jan. 11, 2017

(65) Prior Publication Data
US 2017/0123425 A1 May 4, 2017

Related U.S. Application Data

(63) Continuation of application No. PCT/CN2015/091556, filed on Oct. 9, 2015.

(51) Int. Cl.
G05D 1/02 (2006.01)
G05D 1/10 (2006.01)
(Continued)

(52) U.S. Cl.
CPC ......... *G05D 1/0202* (2013.01); *B64C 39/024* (2013.01); *B64D 47/08* (2013.01); *G05D 1/102* (2013.01); *G06K 9/0063* (2013.01); *G06K 9/00664* (2013.01); *G06K 9/4671* (2013.01); *G06T 7/73* (2017.01); *G01S 19/42* (2013.01); *G05D 1/0011* (2013.01);
(Continued)

(58) Field of Classification Search
CPC ........ G05D 1/02; G05D 1/0272; G05D 1/024; G05D 1/021; G05D 1/0219; G05D 1/0202; G05D 1/102; G06T 7/73; B64C 39/024; B64D 47/08; G06K 9/00664; G06K 9/4671
USPC .......................................................... 701/3
See application file for complete search history.

(56) References Cited

U.S. PATENT DOCUMENTS 5,525,883 A * 6/1996 Avitzour .............. G05D 1/0274
318/568.1
6,442,476 B1 * 8/2002 Poropat ..................... G01S 5/16
701/23
(Continued)

FOREIGN PATENT DOCUMENTS

CN 103149939 A 6/2013
CN 103345751 A 10/2013
(Continued)

OTHER PUBLICATIONS

Achanta, et al. Frequency-tuned salient region detection. In CVPR, 2009. 8 pages.
(Continued)

*Primary Examiner* — Yazan A Soofi
(74) *Attorney, Agent, or Firm* — Anova Law Group, PLLC

(57) ABSTRACT

Apparatus, methods, and computer readable mediums for determining a position of a vehicle are provided. Imaging devices may be coupled to movable objects, such as unmanned aerial vehicles (UAVs). One or more images may be captured by an imaging device, such as a camera. Salient features within the one or more images may be determined. A distance from the vehicle to the salient features may be calculated and a position of the vehicle may be determined.

20 Claims, 9 Drawing Sheets

(51) Int. Cl.
*G06T 7/73* (2017.01)
*B64C 39/02* (2006.01)
*B64D 47/08* (2006.01)
*G06K 9/00* (2006.01)
*G06K 9/46* (2006.01)
*G01S 19/42* (2010.01)
*G05D 1/00* (2006.01)

(52) U.S. Cl.
CPC ............ *G06T 2207/30184* (2013.01); *G06T 2207/30244* (2013.01); *G06T 2207/30252* (2013.01)

(56) References Cited

U.S. PATENT DOCUMENTS

| | | | |
|---|---|---|---|
| 7,177,737 B2 | 2/2007 | Karlsson et al. | |
| 8,320,616 B2 | 11/2012 | Kaiser et al. | |
| 8,396,249 B1 | 3/2013 | Khosla et al. | |
| 8,407,000 B2* | 3/2013 | Vos | G01C 21/005 701/500 |
| 8,798,372 B1 | 8/2014 | Korchev et al. | |
| 8,811,753 B2 | 8/2014 | Stankiewicz et al. | |
| 8,855,819 B2 | 10/2014 | Choi et al. | |
| 9,424,649 B1* | 8/2016 | Tanaka | G06K 9/6202 |
| 10,107,617 B2* | 10/2018 | Cao | H04N 13/106 |
| 2002/0049530 A1* | 4/2002 | Poropat | G01S 5/16 701/23 |
| 2004/0168148 A1 | 8/2004 | Goncalves et al. | |
| 2005/0238198 A1* | 10/2005 | Brown | G06K 9/4609 382/103 |
| 2008/0316324 A1* | 12/2008 | Rofougaran | A63F 13/235 348/222.1 |
| 2009/0112287 A1 | 4/2009 | Greenberg et al. | |
| 2009/0210092 A1 | 8/2009 | Park et al. | |
| 2009/0226034 A1* | 9/2009 | Seki | G06T 7/246 382/103 |
| 2010/0189354 A1* | 7/2010 | de Campos | G06K 9/00597 382/190 |
| 2010/0259630 A1* | 10/2010 | Le Meur | G03B 15/00 348/222.1 |
| 2012/0089937 A1 | 4/2012 | Hsieh et al. | |
| 2012/0093361 A1 | 4/2012 | Huang et al. | |
| 2014/0049644 A1 | 2/2014 | Deigmoeller et al. | |
| 2014/0254922 A1 | 9/2014 | Wang et al. | |
| 2015/0161474 A1* | 6/2015 | Jaber | G06K 9/52 382/203 |
| 2015/0199817 A1* | 7/2015 | Ishimaru | G01S 5/16 382/103 |
| 2016/0063734 A1* | 3/2016 | Divakaran | G06K 9/6202 382/110 |
| 2016/0086050 A1* | 3/2016 | Piekniewski | G06K 9/4671 382/103 |
| 2016/0239973 A1* | 8/2016 | Tanaka | G06T 11/00 |
| 2016/0335475 A1* | 11/2016 | Krenzer | G06K 9/00335 |
| 2017/0053181 A1* | 2/2017 | Tunali | G06K 9/3233 |
| 2017/0230633 A1* | 8/2017 | Doh | H04N 13/117 |
| 2018/0051986 A1* | 2/2018 | Melby | G05D 1/042 |
| 2018/0061055 A1* | 3/2018 | Owechko | G06K 9/4604 |
| 2018/0184062 A1* | 6/2018 | Hariri | H04N 5/23219 |
| 2018/0189565 A1* | 7/2018 | Lukierski | G06T 7/579 |

FOREIGN PATENT DOCUMENTS

| | | |
|---|---|---|
| CN | 103398717 A | 11/2013 |
| CN | 104281148 A | 1/2015 |
| EP | 2735932 B1 | 2/2016 |
| JP | H11083530 A | 3/1999 |
| JP | 2006047252 A | 2/2006 |
| JP | 2011022157 A | 2/2011 |
| JP | 2014232477 A | 12/2014 |
| WO | WO-2007051972 A1 | 5/2007 |
| WO | WO-2012040644 A1 | 3/2012 |
| WO | WO-2014020318 A1 | 2/2014 |

OTHER PUBLICATIONS

Bhatia, et al. Segmenting salient objects in 3D clouds of indoor scenes using geodesic distances. Journal of Signal and Information Processing. 2013; 4:102-108.
Chang, et al. Mobile robot vision navigation and localization using gist and saliency. In: Proc. IEEE/RSJ International Conference on Intelligent Robots and Systems (IROS), Oct. 2010. 8 pages.
Cheng, et al. BING:binarized normed gradients for objectness estimation at 300fps. in IEEE CVPR. 2014. 8 pages.
Goferman, et al. Context-aware saliency detection. IEEE Conf. on Computer Vision and Pattern Recognition. 2010. 8 pages.
Hou, et al. Saliency detection: a spectral residual approach. In IEEE Conference on Computer Vision and Pattern Recognition (CVPR07). IEEE Computer Society. 2007. 8 pages.
International Search Report dated Jul. 15, 2016 for International Application No. PCT/CN2015/091556.
Ip, et al. Saliency-assisted navigation of very large landscape images. IEEE Transactions on Visualization and Computer Graphics. Dec. 2011; 17(12):1737-1746.
Perazzi, et al. Saliency filters: contrast based filtering for salient region detection. In CVPR. 2012. 8 pages.
Roberts, et al. Saliency detection and model-based tracking: a two part vision system for small robot navigation in forested environments. Proc. SPIE 8387, Unmanned Systems Technology XIV, 83870S (May 1, 2012). 12 pages.
Shi, et al. Good features to track. IEEE. 1994; 593-600.
Siagian, et al. Biologically inspired mobile robot vision localization. IEEE Transactions on Robotics. 2009. 13 pages.
Zhang, et al. Saliency detection: a boolean map approach. In CVPR. 2013. 8 pages.
Yasushi Morikawa, et al., Position and Attitude Measuring Experiments with Stereo Vision for Unmanned Helicopter, Proceedings of the 2015 JSME Conference on Robotics and Mechatronics, May 2015, 2 pages, No. 15-2, Kyoto, Japan.
Lategahn Henning et al., Vision-Only Localization, IEEE Transactions on Intelligent Transportation Systems, Jun. 1, 2014, pp. 1246-1257, vol. 15, No. 3.
Frintrop Simone et al., Simultaneous Robot Localization and Mapping Based on a Visual Attention System, Jan. 8, 2007, 14 pages.
Pedro Nunez et al., Visual Odometry Based on Structural Matching of Local Invariant Features Using Stereo Camera Sensor, Sensors 2011, Jul. 18, 2011, pp. 7262-7284, vol. 11.
Michael Milford et al., Feature-based Visual Odometry and Featureless Place Recognition for SLAM in 2.5D Environments, Dec. 7, 2011, pp. 1-8.
Lategahn Henning et al., Urban Localization with Camera and Inertial Measurement Unit, 2013 IEEE Intelligent Vehicles Symposium (IV), IEEE, Jun. 23, 2013, pp. 719-724.
Laurent Itti, et al., A Model of Saliency-Based Visual Attention for Rapid Scene Analysis, IEEE Transactions on Pattern Analysis and Machine Intelligence, pp. 1254-1259, vol. 20, No. 11, Nov. 1998, IEEE.
Andrew J. Davison, Real-Time Simultaneous Localisation and Mapping with a Single Camera, Robotics Research Group, Dept. of Engineering Science, University of Oxford, 8 pages.
Xiaodi Hou, et al. Saliency Detection: A Spectral Residual Approach, 9 pages, ResearchGate, Jun. 2007.
A. Kulshreshtha, et al., Time-Frequency-Tuned Salient Region Detection and Segmentation, 2013 3rd IEEE International Advance Computing Conference (IACC), IEEE, May 13, 2013.

\* cited by examiner

SALIENT FEATURE BASED VEHICLE POSITIONING

CROSS REFERENCE

This application is a continuation application of International Application No. PCT/CN2015/091556, filed on Oct. 9, 2015 which is hereby incorporated by reference in its entirety.

BACKGROUND

Movable objects, such as unmanned aerial vehicles (UAVs), can be used for performing surveillance, reconnaissance, and exploration tasks in a wide variety of environments for military and civilian applications. Such movable objects may include sensors configured to assess a position of the movable object within an environment. Accurate and precise determination of the movable object's position may be of importance in instances when the movable object operates in a semi-autonomous or fully autonomous manner.

Existing approaches for assessing a movable object's position may be less than optimal in some instances. For example, approaches utilizing GPS sensors may be limited by the environment within which the movable object (e.g., UAV) operates in and may require auxiliary supporting sensors onboard. For example, approaches utilizing Simultaneous Localization and Mapping (SLAM) may lack precision and accuracy and may accumulate error over time.

SUMMARY

Embodiments disclosed herein provide apparatuses and methods to assess a movable object's position within an environment. In many embodiments, imaging devices may be used to collect information regarding an environment surrounding the movable object. Image data obtained from the imaging devices can be processed, e.g., to determine salient features within the image. The identified salient features may be further utilized to determine a position of the movable object. Advantageously, the approaches described herein may provide improved and efficient assessment of object positions based on image data and may be used to improve autonomous navigation or control of vehicles.

Thus, in one aspect, a method of determining a position of a vehicle is provided. The method comprises: receiving a plurality of images captured by one or more vision sensors; identifying, with aid of one or more processors, a plurality of stationary salient features from the plurality of images, wherein the plurality of stationary salient features are substantially stationary within an environment; calculating, with aid of the one or more processors, a distance from the vehicle to each of the plurality of stationary salient features; and determining, with aid of the one or more processors, a position of the vehicle based on the distance from the vehicle to each of the plurality of stationary salient features.

In another aspect, an apparatus for determining a position of a vehicle is provided. The apparatus comprises: one or more vision sensors configured to capture a plurality of images; and one or more processors individually or collectively configured to: identify a plurality of stationary salient features from the plurality of images, wherein the plurality of stationary salient features are substantially stationary within an environment; calculate a distance from the vehicle to each of the plurality of stationary salient features; and determine a position of the vehicle based on the distance from the vehicle to each of the plurality of stationary salient features.

In another aspect, a non-transitory computer readable medium comprising program instructions for determining a position of a vehicle is provided. The computer readable medium comprises: program instructions for receiving a plurality of images captured by one or more vision sensors; program instructions for identifying a plurality of stationary salient features from the plurality of images, wherein the plurality of stationary salient features are substantially stationary within an environment; program instructions for calculating a distance from the vehicle to each of the plurality of stationary salient features; and program instructions for determining a position of the vehicle based on the distance from the vehicle to each of the plurality of stationary salient features.

In another aspect, a method of determining a position of a vehicle is provided. The method comprises: receiving a plurality of images captured by one or more vision sensors; identifying, with aid of one or more processors, a plurality of salient features from the plurality of images; calculating, with aid of the one or more processors, a distance from the vehicle to each of the plurality of salient features; and determining, with aid of the one or more processors, a position of the vehicle based on the distance from the vehicle to each of the plurality of salient features and where the position is within an intersection zone of at least two sets of concentric circles, each set centered around at least one of the plurality of salient features.

In another aspect, an apparatus for determining a position of a vehicle is provided. The apparatus comprises: one or more vision sensors configured to capture a plurality of images; and one or more processors individually or collectively configured to: identify a plurality of salient features from the plurality of images; calculate a distance from the vehicle to each of the plurality of salient features; and determine a position of the vehicle based on the distance from the vehicle to each of the plurality of salient features and where the position is within an intersection zone of at least two sets of concentric circles, each set centered around at least one of the plurality of salient features.

In another aspect, a non-transitory computer readable medium comprising program instructions for determining a position of a vehicle is provided. The computer readable medium comprises: program instructions for receiving a plurality of images captured by one or more vision sensors; program instructions for identifying a plurality of salient features from the plurality of images; program instructions for calculating a distance from the vehicle to each of the plurality of salient features; and program instructions for determining a position of the vehicle based on the distance from the vehicle to each of the plurality of salient features and where the position is within an intersection zone of at least two sets of concentric circles, each set centered around at least one of the plurality of salient features.

In another aspect, a method of determining a position of a vehicle is provided. The method comprises: receiving a plurality of images captured by one or more vision sensors; identifying, with aid of one or more processors, a plurality of salient feature candidates from the plurality of images; selecting, with aid of the one or more processors, two or more salient features, wherein the selected salient features are a subset of the plurality of salient feature candidates; calculating, with aid of the one or more processors, a distance from the vehicle to each of the selected salient features; and determining, with aid of the one or more processors, a position of the vehicle based on the distance from the vehicle to each of the selected salient features.

In another aspect, an apparatus for determining a position of a vehicle is provided. The apparatus comprises: one or more vision sensors configured to capture a plurality of images; and one or more processors individually or collectively configured to: identify a plurality of salient feature candidates from the plurality of images; select two or more salient features, wherein the selected salient features are a subset of the plurality of salient feature candidates; calculate a distance from the vehicle to each of the selected salient features; and determine a position of the vehicle based on the distance from the vehicle to each of the selected salient features.

In another aspect, a non-transitory computer readable medium comprising program instructions for determining a position of a vehicle is provided. The computer readable medium comprises: program instructions for receiving a plurality of images captured by one or more vision sensors; program instructions for identifying a plurality of salient feature candidates from the plurality of images; program instructions for selecting two or more salient features, wherein the selected salient features are a subset of the plurality of salient feature candidates; program instructions for calculating a distance from the vehicle to each of the selected salient features; and program instructions for determining a position of the vehicle based on the distance from the vehicle to each of the selected salient features.

In another aspect, a method of determining a position of a vehicle is provided. The method comprises: receiving a plurality of images captured by one or more vision sensors; identifying, with aid of one or more processors, a plurality of salient regions from the plurality of images, wherein the plurality of salient regions correspond to one or more recognizable objects; calculating, with aid of the one or more processors, a distance from the vehicle to each of the plurality of the salient regions; and determining, with aid of the one or more processors, a position of the vehicle based on the distance from the vehicle to each of the plurality of the salient regions.

In another aspect, an apparatus for determining a position of a vehicle is provided. The apparatus comprises: one or more vision sensors configured to capture a plurality of images; and one or more processors individually or collectively configured to: identify a plurality of salient regions from the plurality of images, wherein the plurality of salient regions correspond to one or more recognizable objects; calculate a distance from the vehicle to each of the plurality of the salient regions; and determine a position of the vehicle based on the distance from the vehicle to each of the plurality of the salient regions.

In another aspect, a non-transitory computer readable medium comprising program instructions for determining a position of a vehicle is provided. The computer readable medium comprises: program instructions for receiving a plurality of images captured by one or more vision sensors; program instructions for identifying a plurality of salient regions from the plurality of images, wherein the plurality of salient regions correspond to one or more recognizable objects; program instructions for calculating a distance from the vehicle to each of the plurality of the salient regions; and program instructions for determining a position of the vehicle based on the distance from the vehicle to each of the plurality of the salient regions.

It shall be understood that different aspects of the invention can be appreciated individually, collectively, or in combination with each other. Various aspects of the invention described herein may be applied to any of the particular applications set forth below. Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
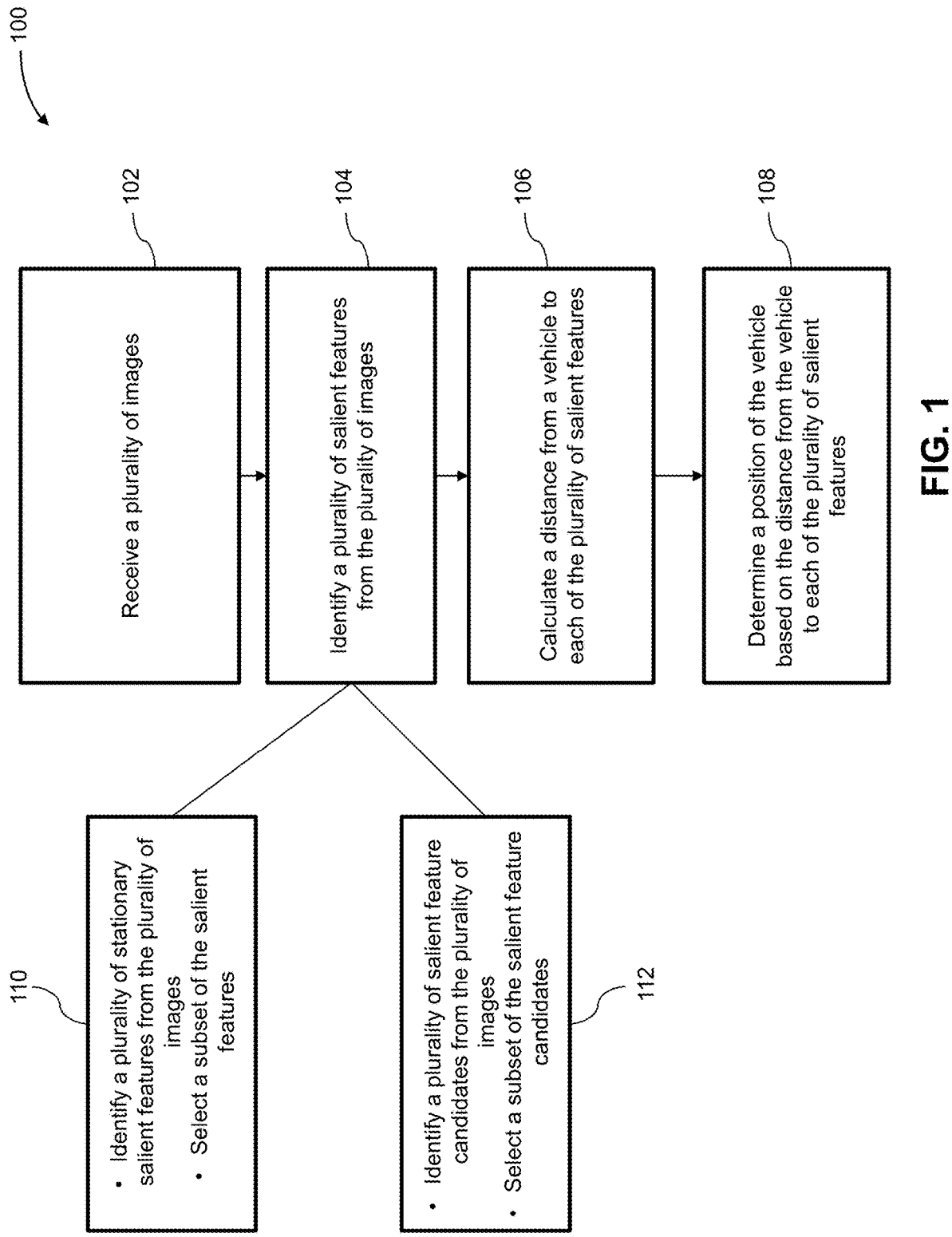
FIG. 1 provides a method of determining a position of a vehicle, in accordance with embodiments.

Systems and methods for assessing a position of movable objects are provided. As used herein, a movable object may refer to any object that may be moved as described elsewhere. For example, a movable object may be a mobile phone, a watch, a UAV, a car, a boat, a computer, a PDA, a tablet, etc. While many embodiments herein are described with reference to UAVs, it shall be understood that the reference is non-limiting, and that the embodiments are equally applicable to any movable object. In some instances, the position of movable objects may be determined with aid of one or more sensors. For example, one or more vision sensors may capture images of an environment. Salient regions within the images may be identified (e.g., determined) as further described elsewhere. A distance from the movable object to each of the salient regions may be calculated, e.g., according to a parallax, and a position of the movable object may be determined, e.g., using a multilateration approach. Information regarding the position (e.g., placement) of movable objects within an environment may further be utilized in applications such as autonomous navigation and control (e.g., of the UAVs).

In some embodiments, a UAV or other movable objects can be adapted to carry one or more sensors. The one or more sensors may be configured to collect relevant data, such as information relating to the UAV's state, the surrounding environment, or the objects and obstacles within the environment. The relevant data may be analyzed, processed, or be used in further applications. For example, based on the relevant data that is collected, it can be possible to generate control signals for controlling UAV navigation. Exemplary sensors suitable for use with the embodiments disclosed herein include location sensors (e.g., global positioning system (GPS) sensors, mobile device transmitters enabling location triangulation), vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, inertial measurement units (IMUs)), altitude sensors, attitude sensors (e.g., compasses) pressure sensors (e.g., barometers), audio sensors (e.g., microphones) or field sensors (e.g., magnetometers, electromagnetic sensors).

Any suitable number and combination of sensors can be used, such as one, two, three, four, five, six, seven, eight, or more sensors. Optionally, the data can be received from sensors of different types (e.g., two, three, four, five, six, seven, eight, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own energy source) and passive sensors (e.g., sensors that detect available energy). As another example, some sensors may generate absolute measurement data that is provided in terms of a global coordinate system (e.g., position data provided by a GPS sensor, attitude data provided by a compass or magnetometer), while other sensors may generate relative measurement data that is provided in terms of a local coordinate system (e.g., relative angular velocity provided by a gyroscope; relative translational acceleration provided by an accelerometer; relative attitude information provided by a vision sensor; relative distance information provided by an ultrasonic sensor, lidar, or time-of-flight camera). In some instances, the local coordinate system may be a body coordinate system that is defined relative to the UAV.

The sensors can be configured to collect various types of data, such as data relating to the UAV, the surrounding environment, or objects within the environment. For example, at least some of the sensors may be configured to provide data regarding a state of the UAV. The state information provided by a sensor can include information regarding a spatial disposition of the UAV (e.g., location or position information such as longitude, latitude, and/or altitude; orientation or attitude information such as roll, pitch, and/or yaw). The state information can also include information regarding motion of the UAV (e.g., translational velocity, translational acceleration, angular velocity, angular acceleration, etc.). A sensor can be configured, for instance, to determine a spatial disposition and/or motion of the UAV with respect to up to six degrees of freedom (e.g., three degrees of freedom in position and/or translation, three degrees of freedom in orientation and/or rotation). The state information may be provided relative to a global coordinate system or relative to a local coordinate system. A global coordinate system may refer to a coordinate system independent to a location of the UAV or another entity. A local coordinate system may refer to a coordinate system relative to the UAV or another entity. For example, a sensor can be configured to determine the distance between the UAV and the user controlling the UAV, or the distance between the UAV and the starting point of flight for the UAV. In some instances, a sensor can be configured to determine the distance between the UAV and an object near the UAV.

The data obtained by the sensors may provide various types of environmental information. For example, the sensor data may be indicative of an environment type, such as an indoor environment, outdoor environment, low altitude environment, or high altitude environment. The sensor data may also provide information regarding current environmental conditions, including weather (e.g., clear, rainy, snowing), visibility conditions, wind speed, time of day, and so on. Furthermore, the environmental information collected by the sensors may include information regarding the objects in the environment, such as the obstacles described herein or landmarks that are recognizable by a processor. Obstacle information may include information regarding the number, density, geometry, spatial disposition, movement, trajectory, and/or velocity of obstacles in the environment.

In some embodiments, a UAV can include one or more vision sensors, also referred to herein as "imaging devices." While many embodiments are described herein as having one imaging device coupled to a UAV, it is to be understood that any number of imaging devices may be coupled to a UAV, such as one, two, three, four, five or more imaging devices. An imaging device can be configured to detect electromagnetic radiation (e.g., visible, infrared, and/or ultraviolet light) and generate image data based on the detected electromagnetic radiation. For example, an imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia).

In some embodiments, the imaging device can be a camera. A camera can be a movie or video camera that captures dynamic image data (e.g., video). A camera can be a still camera that captures static images (e.g., photographs). A camera can be a binocular camera. A binocular camera as used herein may refer to a stereo, or a stereovision camera. A stereo camera may comprise two cameras. A camera may be a monocular camera. Although certain embodiments provided herein are described in the context of cameras, it shall be understood that the present disclosure can be applied to any suitable imaging device. Any description herein relating to cameras can also be applied to any suitable imaging device or other types of imaging devices. A camera can be used to generate 2D images of a 3D scene (e.g., an environment, one or more objects, etc.). The images generated by the camera can represent the projection of the 3D scene onto a 2D image plane.

Accordingly, each point in the 2D image corresponds to a 3D spatial coordinate in the scene. The camera may comprise optical elements (e.g., lens, mirrors, filters, etc.). The camera may capture color images, greyscale image, infrared images, and the like.

The imaging device may capture an image or a sequence of images at a specific image resolution. In some embodiments, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. The camera may be a 4K camera or a camera with a higher resolution.

The imaging device may have adjustable parameters. Under differing parameters, different images may be captured by the imaging device while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light. Parameters controlling for exposure and gain may be collectively considered and be referred to herein as EXPO.

The imaging devices may each have a field of view. The field of view of an imaging device may be the extent of the environment that is detectable (e.g., visible) by the imaging device. The field of view may be related to the angle of view, which may be measured by the angular extent of a given scene that is imaged by the imaging device. The angle of view of an imaging device may be at an angle of less than or about 360°, 300°, 240°, 180°, 150°, 120°, 90°, 60°, 30°, 20°, or 10°. The field of view may be described by the relative direction of the imaging device to the movable object. For example, the field of view may be oriented vertically, horizontally, upward, downward, side-ways, and the like relative to the movable object (e.g., a UAV). The imaging devices may each have an optical axis. The optical axis of an imaging device, which may also be referred to as the "principal axis," can be a line along which there is some degree of rotational symmetry in the imaging device. In some embodiments, the optical axis of the imaging device passes through the center of the optical components (e.g., lens, photo sensor) of the imaging device.

Imaging devices of the present disclosure can be situated on any suitable portion of a movable object, such as above, underneath, on the side(s) of, or within a body of the movable object. Some imaging devices can be mechanically coupled to the UAV such that the spatial disposition and/or motion of the movable object correspond to the spatial disposition and/or motion of the imaging device. The imaging devices can be coupled to the movable object via a rigid coupling, such that the imaging device does not move relative to the portion of the movable object to which it is attached. Alternatively, the coupling between the imaging device and the movable object can permit movement (e.g., translational or rotational movement relative to the UAV) of the imaging device relative to the movable object. For example, coupling between the imaging device and the movable object via a carrier such as a gimbal may permit movement of the imaging device relative to the movable object. The movement of the imaging device relative to the movable object may be translational (e.g., vertical, horizontal) and/or rotational (e.g., about a pitch, yaw, and/or roll axis). The movement of the imaging device relative to the movable object may be of a predetermined or known amount. One or more sensors may detect the movement of the imaging device relative to the vehicle. The movement of the imaging device relative to the movable object may be controlled remotely by user input, autonomously, or semi-autonomously. The coupling can be a permanent coupling or non-permanent (e.g., releasable) coupling. Suitable coupling methods can include adhesives, bonding, welding, and/or fasteners (e.g., screws, nails, pins, etc.). Optionally, the imaging device can be integrally formed with a portion of the movable object. Furthermore, the imaging device can be electrically coupled with a portion of the movable object (e.g., processing unit, control system, data storage) so as to enable the data collected by the imaging device to be used for various functions of the UAV (e.g., navigation, control, propulsion, communication with a user or other device, etc.), such as the embodiments discussed herein. The imaging device may be operably coupled with a portion of the UAV (e.g., processing unit, control system, data storage).

One or more images may be captured by an imaging device. A sequence of two or more images may be captured by an imaging device. For example, a sequence of about 2, 3, 4, 5, 10, 15, 20, 25, 50, 100, 150, 200, or more images may be captured by the imaging device. The imaging device may capture a sequence of images at a specific capture rate. In some embodiments, the sequence of images may be captured at standard video frame rates such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.002 seconds, 0.05 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, texture of environment being captured).

Images obtained by the imaging devices described herein can be used for a variety of applications related to UAV operation. In some embodiments, the images are used to facilitate UAV navigation within an environment (e.g., autonomously, semi-autonomously, or manually). In some embodiments, the images are used for obstacle detection and avoidance. In some embodiments, the images can be processed to assess or determine state information for the UAV The state information may include position information, orientation information, velocity information (e.g., angular velocity or translational velocity), and/or acceleration information (e.g., angular acceleration or translational acceleration). The state information can be assessed or determined using (e.g., processing with one or more processors) one or more images obtained by one or more imaging devices.

For example, the image(s) captured by the imaging device(s) may be used to determine a position of the UAV within an environment. FIG. 1 provides a method 100 of determining a position of a vehicle (e.g., UAV), in accordance with embodiments. Similarly, a non-transitory computer readable medium containing program instructions for executing method 100 may be provided as well. In step 102, a plurality of images is received by one or more processors. A processor may comprise a field-programmable gate array (FPGA), application-specific integrated circuit (ASIC), application-specific standard product (ASSP), digital signal processor (DSP), central processing unit (CPU), graphics processing unit (GPU), vision processing unit (VPU), complex programmable logic devices (CPLD), and the like. A processor may be an on-board processor on-board a movable object (e.g., a UAV) or an embedded processor carried by the imaging device. A processor may be an off-board processor separated from the UAV and/or the imaging device (e.g., at a ground station, communicating with a UAV and/or camera). The one or more processors as referred to herein may be individually or collectively configured to further aid in steps 104, 106, and 108 as recited herein.

In some embodiments, the plurality of images is captured by a single imaging device. For example, a plurality of images may comprise two or more images captured by a single imaging device over a time interval. The time interval may be equal to about or less than 1 s, 2 s, 3 s, 4 s, 5 s, 6 s, 7 s, 8 s, 9 s, 10 s, 15 s, 20 s, 30 s, 45 s, or 60 s. In some embodiments, the plurality of images is captured by two or more imaging devices. The two or more imaging devices may be of the same type or different types of imaging devices. For example, the two or more imaging devices may comprise monocular cameras, binocular cameras, still camera and video cameras. In some embodiments, the plurality of images may comprise one or more images each captured by two or more imaging devices with a different field of view at a single point in time, or over a time interval. For example, the plurality of images may comprise two or more images captured by two or more imaging devices over a time interval. The time interval may be equal to about or less than 1 s, 2 s, 3 s, 4 s, 5 s, 6 s, 7 s, 8 s, 9 s, 10 s, 15 s, 20 s, 30 s, 45 s, or 60 s. The plurality of images may comprise about 2, 3, 4, 5, 10, 15, 20, 25, 50, 100, 150, 200, 250, 300, 500, 1000, or more images. The plurality of images may be captured while the vehicle is in motion (e.g., while a UAV is in flight). The plurality of images may be captured while the vehicle is stationary. The plurality of images may be captured in an indoor or outdoor environment.

In step 104, a plurality of salient features is identified from the plurality of images using one or more processors. In some embodiments, one or more salient features are identified from the plurality of images using one or more processors. As used herein, salient features may refer to salient regions or distinct (e.g., recognizable) objects within an image. Salient features may refer to elements within an image that are likely to stand out or catch attention of a human observer. A salient feature may have semantic meaning. Salient features may refer to elements that may be identified consistently under computer vision processes. A salient feature may refer to animate objects, inanimate objects, landmarks, marks, logos, obstacles, and the like within an image. A salient feature may be persistently observed under differing conditions. For example, a salient feature may be persistently identified (e.g., by a human observer or by computer programs) in images acquired from different points of view, during different times of the day, under different lighting conditions, under different weather conditions, under different image acquisition settings (e.g., different gain, exposure, etc.), and the like. For example, salient features may include humans, animals, faces, bodies, structures, buildings, vehicles, planes, signs, and the like.

Salient features may be identified or determined using any existing saliency calculating (e.g., detection) methods. In some instances, the saliency detection method may be learning based or image-processing based. For example, salient features may be identified by contrast based filtering (e.g., color, intensity, orientation, size, motion, depth based, etc.), using a spectral residual approach, via frequency-tuned salient region detection, via a binarized normed gradients for objectness estimation, using a context-aware top down approach, by measuring visual saliency by site entropy rate, and the like. For example, salient features may be identified in a saliency map that is generated by subjecting one or more images to contrast based filtering (e.g., color, intensity, orientation, etc.). A saliency map may represent areas with feature contrasts. A saliency map may be a predictor where people will look. A saliency map may comprise a spatial heat map representation of features or fixations. For example, in a saliency map, salient regions may have a higher luminance contrast, color contrast, edge content, intensities, etc., than non-salient regions. In some embodiments, salient features may be identified using object recognition algorithms (e.g., feature based methods, appearance based methods, etc.). Optionally, one or more objects or types of patterns, objects, figures, colors, logos, outlines, etc. may be pre-stored as possible salient features. An image may be analyzed to identify salient features that are pre-stored (e.g., an object or types of objects). The pre-stored salient features may be updated. Alternatively, salient features may not need to be pre-stored. Salient features may be recognized on a real time basis independent to pre-stored information.

In some embodiments, step 104 may comprise identifying a plurality of salient features and selecting a subset of the identified plurality of salient features as shown in 110. A subset may include all or part of the identified plurality of salient features. In some embodiments, step 104 may comprise identifying a plurality of salient feature candidates and selecting a subset of the salient feature candidates for further processing as shown in 112. A subset may include all or part of the plurality of salient feature candidates. In some instances, a predetermined number of salient features may be selected from the plurality of identified salient features (or identified salient feature candidates). For example, the predetermined number of salient features that are selected may be equal to about or less than 2, 3, 4, 5, 10, 15, 20, 25, 50, 100, 150, 200, 500, 1000, 2000, 3000, or 5000 salient features. In some instances, only salient features (or salient feature candidates) that satisfy a certain condition or meet a criterion may be identified and/or selected. For example, salient features (or salient feature candidates) that are stationary or substantially stationary may be selected. For example, salient features (or salient feature candidates) that meet or exceed a predetermined discrimination (e.g., variance in pixel gray level, contrast level, color, orientation, intensity, complexity, etc.) may be selected. In some instances, a predetermined number of salient features that meet or best fit a criterion may be selected. For example, 2, 3, 4, 5, 10, 15, 20, 25, 50, 100, 150, 200, 500, 1000, 2000, 3000, or 5000 salient features having the highest contrast level within the plurality of images may be selected. As used herein, identifying a plurality of salient features (or salient feature candidates) and selecting a subset of the salient features (or salient feature candidates) may also be referred to as identifying a subset of the salient features (or salient feature candidates). For example, identifying a plurality of salient features from a plurality of images and selecting salient features that are stationary for further processing (e.g., for computer vision) may be referred to as identifying a plurality of stationary salient features from a plurality of images.

As used herein, a stationary salient feature may refer to salient features that experience no positional change within the plurality of images. Stationary salient features may be identified from a plurality of images taken by a single imaging device (e.g., time lapse images) and/or from a plurality of images taken by two or more imaging devices. Salient features may be determined to experience no positional change if they experience no positional change absolutely within the plurality of images. For example, the salient feature may occupy a fixed position within the plurality of images. For example, a single camera onboard a stationary or hovering UAV may acquire a plurality of images containing image data of a building over a time period. The building may retain a fixed position (e.g., or substantially fixed position) within the plurality of images and may be determined to experience no positional change. Alternatively or in conjunction, salient features may be determined to experience no positional change if they experience no positional change within the plurality of images relative to (e.g., in consideration of, compensating for) other factors. For example, the salient feature may occupy different positions within the plurality of images but if the position of the salient feature within each image is countervailed (e.g., offset) with other factors such as displacement of the vehicle, imaging device, carrier that supports the imaging device, or displacement/orientation between differing imaging devices, the salient feature may be determined to experience no positional change. For example, a moving UAV may acquire a plurality of images containing image data of a building. The building may occupy a different position within each of the plurality of images. However, when countervailed with the movement of the UAV, the building may be determined to experience no positional change within the plurality of images. In some instances, the movement of the UAV may be measured with sensors such as inertial sensors. A substantially stationary salient feature may refer to salient features that experience about or less than 1%, 2%, 5%, 10%, 15%, 20%, or 30% positional change within the plurality of images. A salient feature may be stationary or may be non-stationary. Stationary objects such as a building may be identified as a stationary salient feature in an image. Animate or inanimate objects may be identified as a stationary salient feature within an image.

Figure 2:
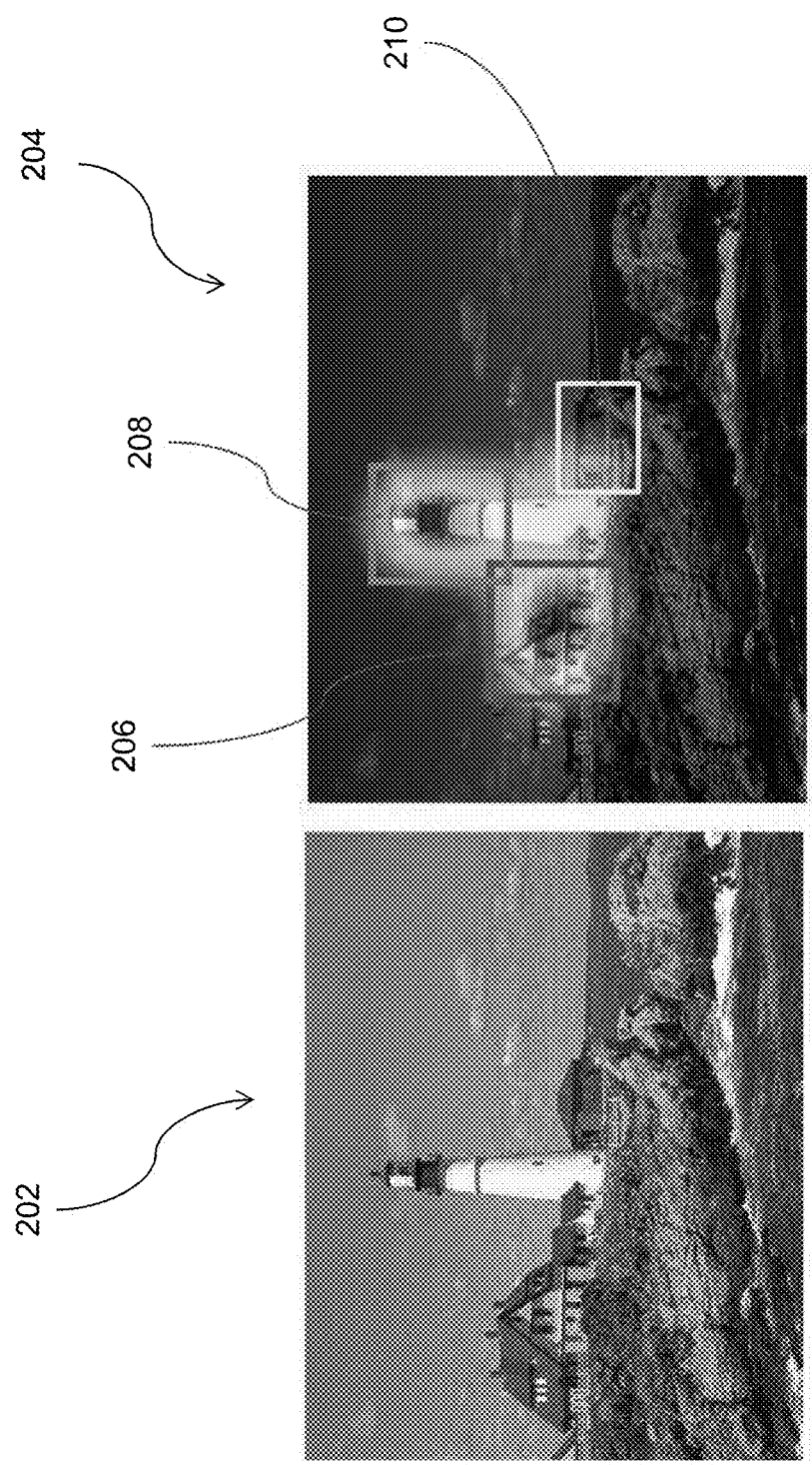
FIG. 2 illustrates an image captured by an imaging device and a saliency map of the image, in accordance with embodiments.

FIG. 2 illustrates an image 202 captured by an imaging device and a saliency map 204 of the image, in accordance with embodiments. A saliency map 204 may be obtained by subjecting image 202 to filtering. After filtering, each pixel within the saliency map may describe how salient that pixel is. Portions of the saliency map may be classified as salient feature candidates. For example, FIG. 2 shows three salient feature candidates 206, 208, and 210. Salient feature candidates may be generated, e.g., randomly or exhaustively for evaluation of distinctiveness of the salient feature candidates. In some instances, boxes may be generated so that it covers an object (e.g., salient feature candidate) for evaluation of distinctiveness of the bounding box. While FIG. 2 shows the objects bound by a box, it is to be understood that the objects may be encompassed by any given shape (e.g., circle, oval, triangle, etc.) for evaluation of distinctiveness.

A discrimination of the salient feature candidates may be determined in order to classify the bounding box (e.g., salient feature candidate) into a salient feature (e.g., salient object) or not (e.g., an uninterested background), e.g., via thresholding or via trained classifiers. For example, a variance in pixel gray level for each salient feature candidate (e.g., each bounding box) may be calculated. If variance of the salient feature candidate exceeds a certain threshold, that may signify that the discrimination is large enough, and that portion of the image may be selected as a salient feature or salient object. Alternatively, if variance of the salient feature candidate does not exceed certain threshold, that may signify that the discrimination is not large enough, and that portion of the image may be dropped as a salient feature candidate or classified as an uninterested background). In some instances, discrimination of the salient feature candidates may be determined via trained classifier (e.g., support vector machine, random forest).

In FIG. 2 only salient feature candidates 206 and 208 were determined to have a variance in pixel gray level that exceeded a predetermined threshold and salient feature candidate 210 was dropped as a salient feature candidate. In some instances, salient feature candidates that have not been dropped may be selected as a salient feature. In some instances, salient feature candidates that have not been dropped may be selected as a salient feature if they satisfy other conditions. For example, salient feature candidates may be tracked over consecutive video frames (e.g., if a plurality of images were taken by imaging devices over a time interval). If the salient feature candidates are determined to experience no positional change in consecutive video frames (e.g., after the imaging device's movement has been compensated for), the salient feature candidate may be selected as a salient feature. In FIG. 2 salient feature candidates 206 and 208 were determined to be stationary over consecutive image frames (not shown) and were selected as salient features.

The identified (e.g., or selected) plurality of salient features (or salient feature candidates) may be further processed, e.g., for use in computer vision. In step 106, a distance from the vehicle to each of the plurality of salient features is calculated using one or more processors. In some instances, a virtual coordinate may be set for each salient feature. The virtual coordinate may be in a two-dimensional coordinate or a three-dimensional coordinate system. In some instances, the position of one of the salient features may be set as an origin coordinate and the coordinate of the UAV and/or other salient features may be relative to the salient feature. In some instances, the position of the vehicle may be set as an origin coordinate and the coordinate of the salient feature may be relative to the vehicle. A distance from the vehicle to the salient feature may be determined by calculating a depth of the scene (e.g., depth of the salient feature) according to a parallax. For example, a vehicle may acquire a plurality of images from different positions. Nearby objects may have a larger parallax than more distant objects when observed from different positions, and a parallax may be used to determine distances to the salient features. A distance to a salient feature may refer to a distance to a salient feature area. For example, the distance to a salient feature may refer to a distance to a center of the salient feature (e.g., horizontal center, vertical center, or both), a distance to a center of mass of the salient feature, etc. A calculation of distance to a salient feature area (e.g., not a point) may minimize calculating errors that may arise from unstable features. A coordinate of a salient feature may refer to a coordinate of a salient feature area. In some instances, a coordinate of a salient feature may refer to a coordinate of a center of the salient feature (e.g., horizontal center, vertical centers, or both), a coordinate of a center of mass of the salient feature, etc. In some embodiments, it is not necessary to calculate two-dimensional or three-dimensional coordinates for the vehicle or each of the salient features. A virtual coordinate of each of the salient features may be stored in a memory operably coupled to a processor on or off-board the imaging device or the vehicle. A distance to each salient feature may be stored in a memory operably coupled to a processor on or off-board the imaging device or the vehicle. A distance between the vehicle and salient features may be calculated in real time. For example, a distance between the vehicle and salient features may be calculated while the vehicle is in motion, e.g., while a UAV is in flight. Movement of the vehicle may be determined with aid of one or more inertial sensors. The position of salient features may remain stationary while the distance between the vehicle and salient features are being calculated. The position of salient features may be changing while the distance between the vehicle and salient features are being calculated. In some embodiments, a global map of the salient features may be maintained (e.g., in a memory operably coupled to a processor on or off-board the imaging device or the vehicle). In some embodiments, it is not necessary to maintain a global map of environment or the salient features and a position of the vehicle may be determined as salient features are determined in the plurality of images and a distance to the salient features are calculated.

In step 108, a position of the vehicle is determined based on a distance from the vehicle to each of the plurality of salient features. A position of the vehicle may be determined in a two-dimensional coordinate system based on two or more salient features. A position of the vehicle may be determined in a three dimensional coordinate system based on three or more salient features. The position of the vehicle may be determined according to multi-point (e.g., trilateration, multilateration, etc.) principles.

Figure 3:
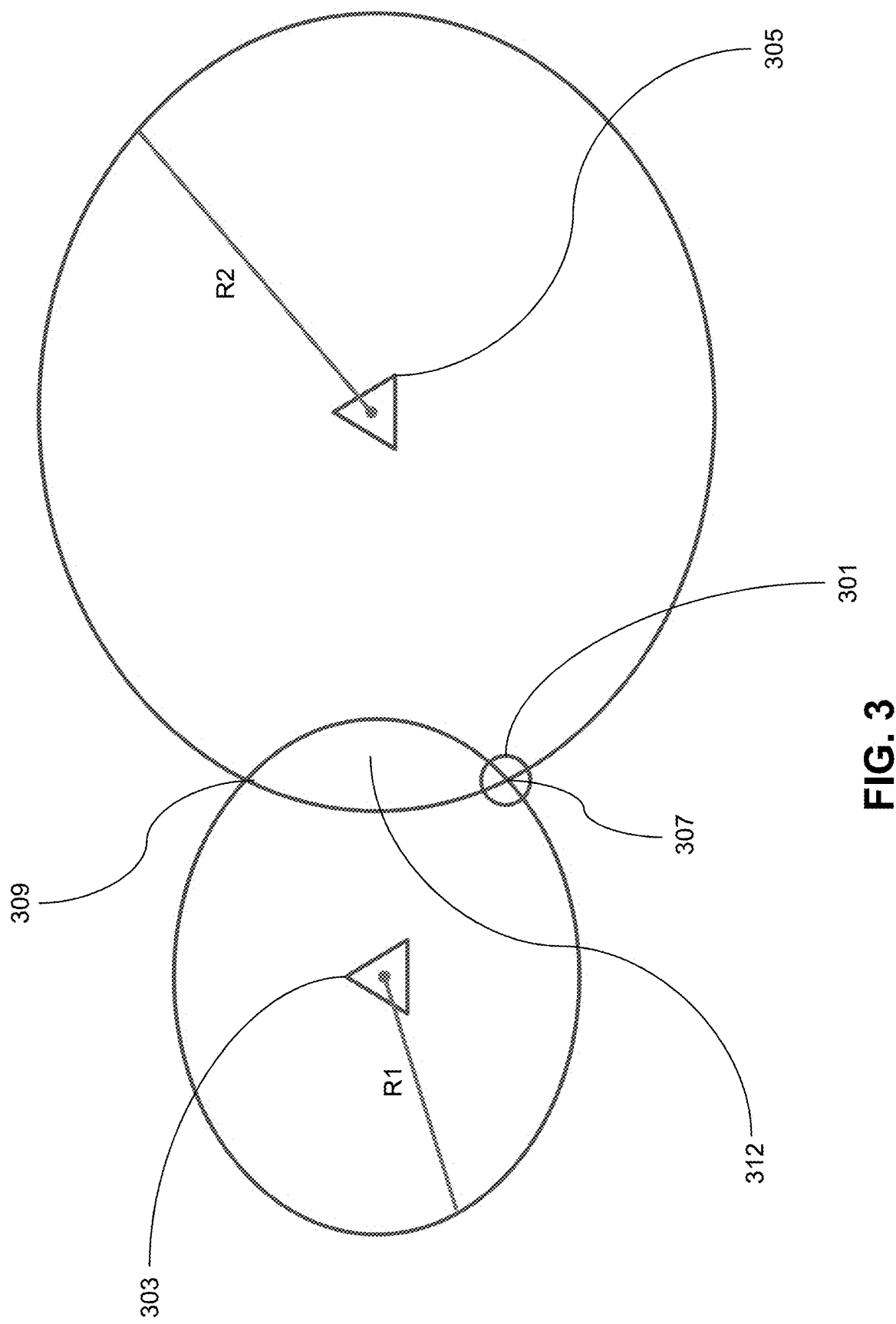
FIG. 3 illustrates a position of a movable object being determined according to distances from the movable object to salient features, in accordance with embodiments.

FIG. 3 illustrates a position of a movable object being determined according to distances from the movable object to salient features, in accordance with embodiments. As illustrated, a position of the movable object 301 in a two-dimensional coordinate system may be determined based on a distance R1, R2 to the two salient features 303, 305. A distance of each of the plurality of salient features to the vehicle may be determined according to step 106 of method 100. A circle of radius R1 may be traced around the virtual coordinate of salient feature 303 and a circle of radius R2 may be traced around the virtual coordinate of salient feature 305. Two points 307, 309 where the circles intersect may be possible positions of the movable object. In some instances, a position of the movable object may be within an intersection zone 312 of the circles. A third salient feature may with a known (e.g., previously determined) distance may be utilized to determine an exact placement of the movable object (e.g., between position 307 and 309).

The same principle may be applied to determining a three dimensional position of a movable object based on three or more salient features. For example, a position within an intersection of three circles centered respectively at each of the three salient features and of appropriate distance (e.g., of appropriate radius) to each of the three salient features may be determined to be a position of a movable object. Additional salient features may be considered to improve determination of position of the movable object's position.

Figure 4:
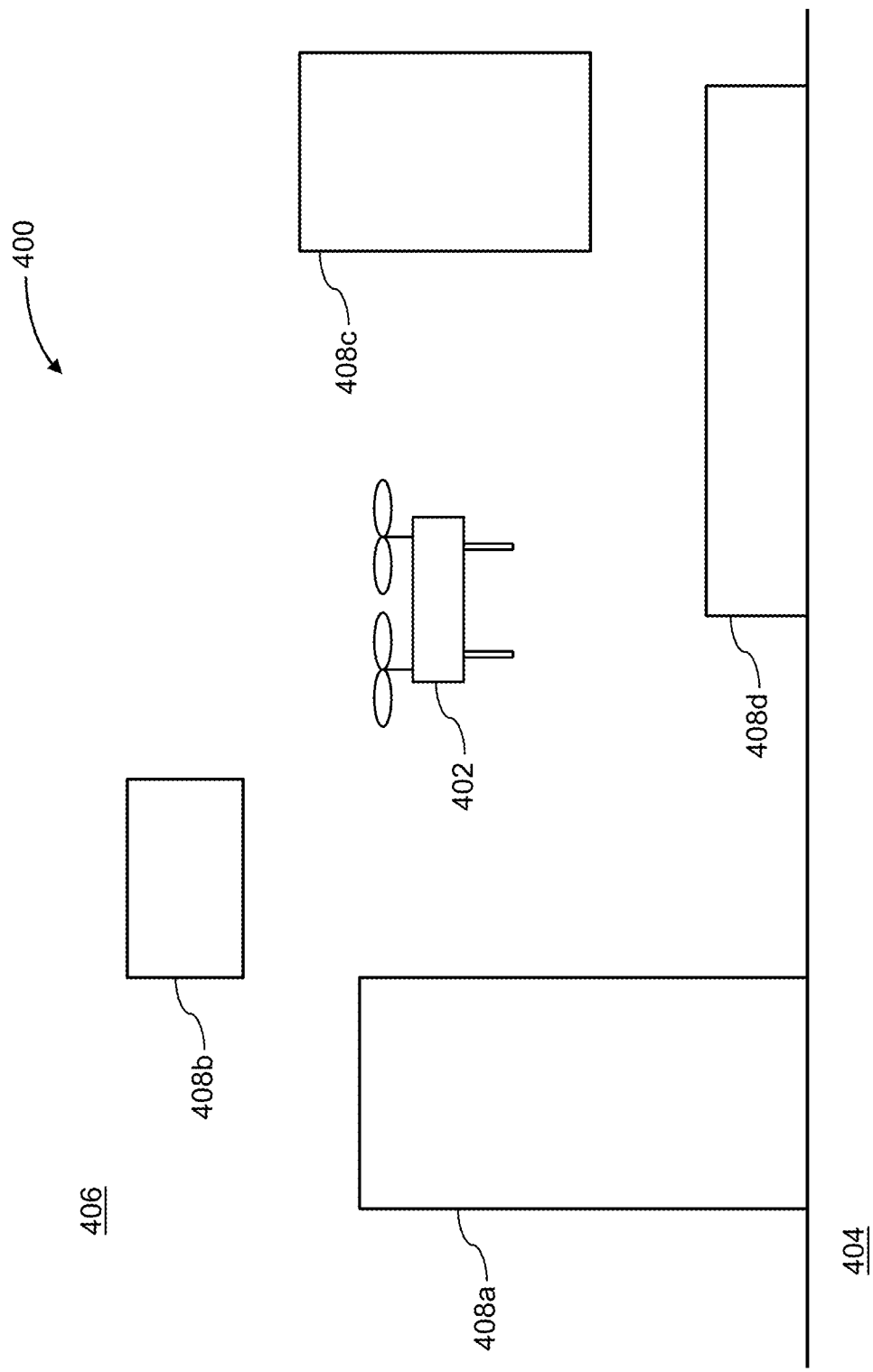
FIG. 4 illustrates a UAV operating in an outdoor environment, in accordance with embodiments.

The apparatus, methods, and computer readable mediums disclosed herein may offer improved operational capabilities for movable objects. FIG. 4 illustrates a UAV 402 operating in an outdoor environment 400, in accordance with embodiments. The outdoor environment 400 may be an urban, suburban, or rural setting, or any other environment that is not at least partially within a building. The UAV 402 may be operated relatively close to the ground 404 (e.g., low altitude) or relatively far from the ground 404 (e.g., high altitude). For example, a UAV 402 operating less than or equal to approximately 10 m from the ground may be considered to be at low altitude, while a UAV 402 operating at greater than or equal to approximately 10 m from the ground may be considered to be at high altitude.

In some embodiments, the outdoor environment 400 includes one or more objects 408a-d. Some objects may be situated on the ground 404 (e.g., objects 408a, 408d), such as buildings, ground vehicles (e.g., cars, motorcycles, trucks, bicycles), human beings, animals, plants (e.g., trees, bushes), and other manmade or natural structures. Some objects may be in contact with and/or supported by the ground 404, water, manmade structures, or natural structures. Alternatively, some objects may be wholly located in the air 406 (e.g., objects 408b, 408c) and may be mobile (e.g., aerial vehicles, airplanes, helicopters, hot air balloons, UAVs, or birds). Aerial objects may not be supported by the ground 404, or by water, or by any natural or manmade structures. An obstacle located on the ground 404 may include portions that extend substantially into the air 406 (e.g., tall structures such as towers, skyscrapers, lamp posts, radio towers, power lines, trees, etc.).

Figure 5:
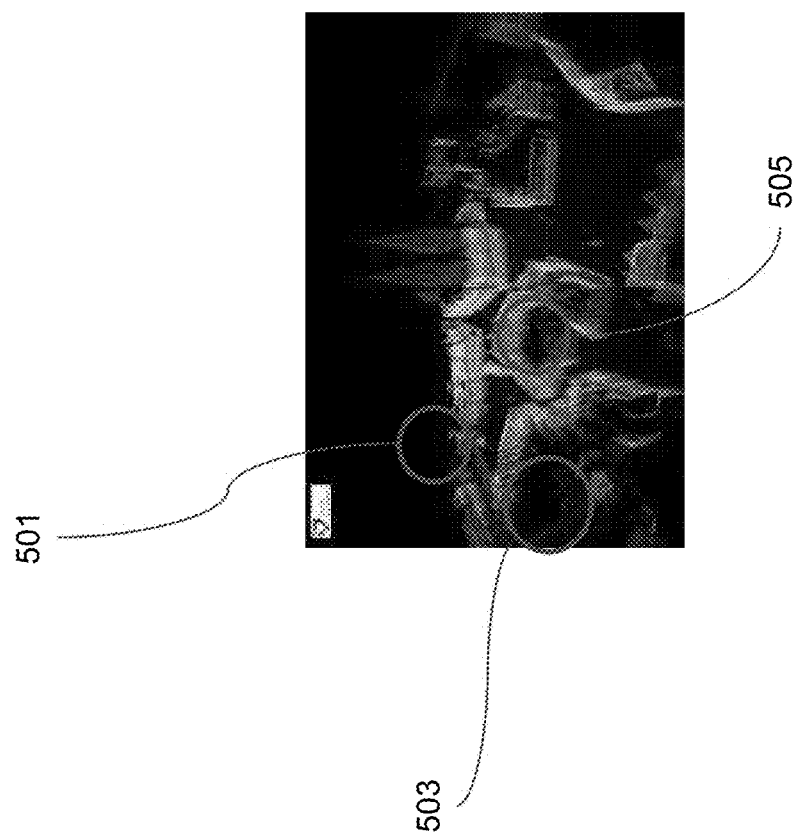
FIG. 5 illustrates a point cloud calculation being done in SLAM, in accordance with embodiments.

In some instances, sensors such as GPS sensors may be utilized for positioning UAV 402 in an outdoor environment 400. In some embodiments, objects may interfere with GPS signals and a GPS signal may not be available in an outdoor environment. In some embodiments, a precision of positioning based on GPS sensors may be on the order of meters and auxiliary positioning sensors may be necessary for precise positioning (e.g., IMU sensors, imaging devices). In some instances, SLAM may be utilized for positioning UAV in an outdoor environment. FIG. 5 illustrates a point cloud calculation being done in SLAM, in accordance with embodiments. A three-dimensional coordinate may be calculated for each point in an image (e.g., 501, 503, 505) and a global map of the environment may be maintained. In some instances, unstable features may give rise to calculating errors which may accumulate. Vision sensors may be utilized as an alternative or supplement to the other sensors or methods (e.g., GPS or SLAM) for positioning UAVs in an environment. For example, vision sensors may be utilized in areas in which GPS sensors do not work.

In some instances, one or more vision sensors coupled to the UAV 402 may acquire a plurality of images of the outdoor environment 400, including image data of the objects. The image data of the objects may be salient features within the images. The image data of the object may be stationary salient features within the images. In some embodiments, only stationary salient features may be considered for determining a position of a movable object. A position of the UAV 402 may be determined by measuring a distance of the UAV to two or more salient features as previously described herein. A position of the UAV may be determined without maintaining a global map of the environment and there may be minimal or no error accumulation. Positioning of movable objects according to the apparatus and methods of the present application may be about or within 1 cm, 5 cm, 10 cm, 20 cm, 50 cm, 75 cm, 100 cm, 1.5 m, 2 m, 5 m, or 10 m of the actual position of the movable object relative to the salient features. The determination of position of the movable object may be utilized in further operations. For example, position information may be utilized to navigate UAV 402 in an outdoor environment 400. In some instances, the one or more vision sensors may be sufficient for navigating UAV in an outdoor environment. In some instances, the one or more vision sensors may be utilized in conjunction with one or more other sensors (e.g., IMU sensors) for navigation.

Figure 6:
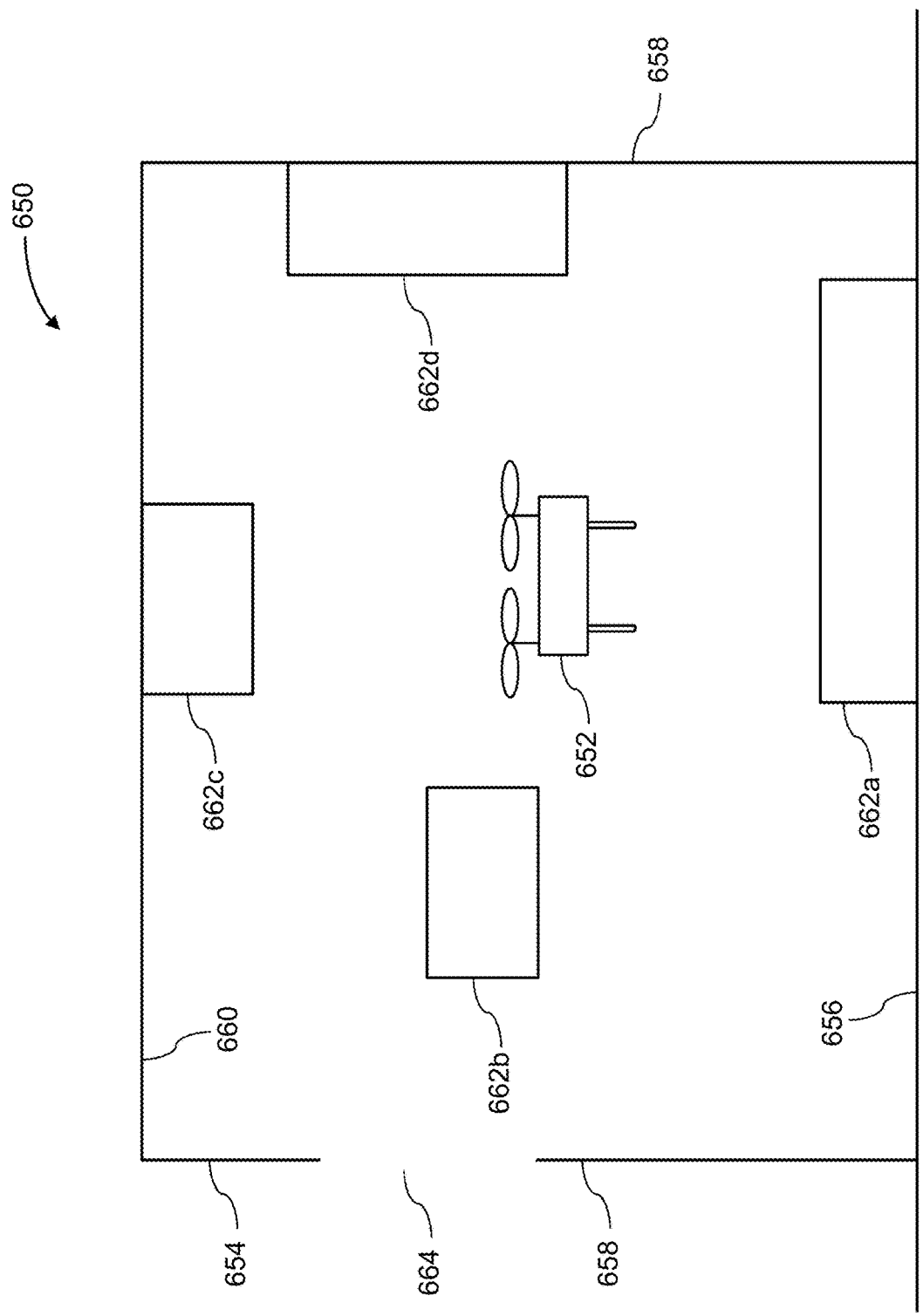
FIG. 6 illustrates a UAV operating in an indoor environment, in accordance with embodiments.

FIG. 6 illustrates a UAV 652 operating in an indoor environment 650, in accordance with embodiments. The indoor environment 650 is within the interior of a building 654 having a floor 656, one or more walls 658, and/or a ceiling or roof 660. Exemplary buildings include residential, commercial, or industrial buildings such as houses, apartments, offices, manufacturing facilities, storage facilities, and so on. The interior of the building 654 may be completely enclosed by the floor 656, walls 658, and ceiling 660 such that the UAV 652 is constrained to the interior space. Conversely, at least one of the floor 656, walls 658, or ceiling 660 may be absent, thereby enabling the UAV 652 to fly from inside to outside, or vice-versa. Alternatively or in combination, one or more apertures 864 may be formed in the floor 656, walls 658, or ceiling 660 (e.g., a door, window, skylight).

Similar to the outdoor environment 400, the indoor environment 650 can include one or more objects 662*a-d*. Some objects may be situated on the floor 656 (e.g., obstacle 662*a*), such as furniture, appliances, human beings, animals, plants, and other manmade or natural objects. Conversely, some objects may be located in the air (e.g., object 662*b*), such as birds or other UAVs. Some obstacles in the indoor environment 650 can be supported by other structures or objects. Objects may also be attached to the ceiling 660 (e.g., obstacle 662*c*), such as light fixtures, ceiling fans, beams, or other ceiling-mounted appliances or structures. In some embodiments, objects may be attached to the walls 658 (e.g., obstacle 662*d*), such as light fixtures, shelves, cabinets, and other wall-mounted appliances or structures. Notably, the structural components of the building 654 can also be considered to be objects, including the floor 656, walls 658, and ceiling 660.

The objects described herein may be substantially stationary (e.g., buildings, plants, structures) or substantially mobile (e.g., human beings, animals, vehicles, or other objects capable of movement). Some objects may include a combination of stationary and mobile components (e.g., a windmill). Mobile objects or obstacle components may move according to a predetermined or predictable path or pattern. For example, the movement of a car may be relatively predictable (e.g., according to the shape of the road). Alternatively, some mobile objects or object components may move along random or otherwise unpredictable trajectories. For example, a living being such as an animal may move in a relatively unpredictable manner.

In some embodiments, a GPS signal may not be available in an indoor environment and GPS sensors may not be utilized for positioning UAV 652 in an indoor environment. In some instances, SLAM may be utilized for positioning UAV in an indoor environment. For positioning based on SLAM, a three-dimensional coordinate may be calculated for each point in an image and a global map of the environment may be maintained. In some instances, unstable features may give rise to calculating errors which may accumulate. Vision sensors may be utilized as an alternative or supplement to the other sensors or methods (e.g., GPS or SLAM) for positioning UAVs in an environment. For example, vision sensors may be utilized in areas in which GPS sensors do not work (e.g., indoor environment).

In some instances, one or more vision sensors coupled to the UAV 652 may acquire a plurality of images of the indoor environment 650, including image data of the objects. The image data of the objects may be salient features within the images. The image data of the object may be stationary salient features within the images. In some embodiments, only stationary salient features may be considered for determining a position of a movable object. In some embodiments, both stationary salient features and mobile features that move according to a predictable path or pattern may be considered for determining a position of a movable object. A position of the UAV 652 may be determined by measuring a distance of the UAV to two or more salient features as previously described herein. A position of the UAV may be determined without maintaining a global map of the environment and there may be minimal or no error accumulation. Positioning of movable objects according to the apparatus and methods of the present application may be about or within 1 cm, 5 cm, 10 cm, 20 cm, 50 cm, 75 cm, 100 cm, 1.5 m, 2 m, 5 m, or 10 m of the actual position of the movable object relative to the salient features. The determination of position of the movable object may be utilized in further operations. For example, position information may be utilized to navigate UAV 652 in an indoor environment 650. In some instances, the one or more vision sensors may be sufficient for navigating UAV in an indoor environment. In some instances, the one or more vision sensors may be utilized in conjunction with one or more other sensors (e.g., IMU sensors) for navigation.

The embodiments provided herein may unable use of relatively few features (e.g., salient features) for determining a position of a vehicle, positioning vehicles, autonomous navigation and control, etc. The use of few features may require less or minimal processing power during vehicle navigation. The use of few features (e.g., rather than points) may give rise to less error (e.g., due to minimizing the effects of unstable feature points) and enable precise and accurate navigation and control of vehicles. Determination of position or self-positioning based on distance to features (e.g., salient features) without need to maintain a global map may decrease accumulation of error and enable precise and accurate navigation and control of vehicles. Use of salient features may permit fewer features to be needed for determination of a position because they are often uniquely identifiable (e.g., consistently and repeatedly identifiable). Salient feature may also be identified on an ad hoc or real-time basis without requiring pre-stored patterns or objects. This may reduce processing time requirements to search for image matches, etc.

The embodiments provided herein can be applied to various types of UAVs. For instance, the UAV may be a small-scale UAV that weighs no more than 10 kg and/or has a maximum dimension of no more than 1.5 m. In some embodiments, the UAV may be a rotorcraft, such as a multi-rotor aircraft that is propelled to move through the air by a plurality of propellers (e.g., a quadcopter). Additional examples of UAVs and other movable objects suitable for use with the embodiments presented herein are described in further detail below.

The UAVs described herein can be operated completely autonomously (e.g., by a suitable computing system such as an onboard controller), semi-autonomously, or manually (e.g., by a human user). The UAV can receive commands from a suitable entity (e.g., human user or autonomous control system) and respond to such commands by performing one or more actions. For example, the UAV can be controlled to take off from the ground, move within the air (e.g., with up to three degrees of freedom in translation and up to three degrees of freedom in rotation), move to target location or to a sequence of target locations, hover within the air, land on the ground, and so on. As another example, the UAV can be controlled to move at a specified velocity and/or acceleration (e.g., with up to three degrees of freedom in translation and up to three degrees of freedom in rotation) or along a specified movement path. Furthermore, the commands can be used to control one or more UAV components, such as the components described herein (e.g., sensors, actuators, propulsion units, payload, etc.). For instance, some commands can be used to control the position, orientation, and/or operation of a UAV payload such as a camera. Optionally, the UAV can be configured to operate in accordance with one or more predetermined operating rules. The operating rules may be used to control any suitable aspect of the UAV, such as the position (e.g., latitude, longitude, altitude), orientation (e.g., roll, pitch yaw), velocity (e.g., translational and/or angular), and/or acceleration (e.g., translational and/or angular) of the UAV. For instance, the operating rules can be designed such that the UAV is not permitted to fly beyond a threshold height, e.g., the UAV can be configured to fly at a height of no more than 400 m from the ground. In some embodiments, the operating rules can be adapted to provide automated mechanisms for improving UAV safety and preventing safety incidents. For example, the UAV can be configured to detect a restricted flight region (e.g., an airport) and not fly within a predetermined distance of the restricted flight region, thereby averting potential collisions with aircraft and other obstacles.

The systems, devices, and methods described herein can be applied to a wide variety of movable objects. As previously mentioned, any description herein of a UAV may apply to and be used for any movable object. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. The movable object may be a self-propelled unmanned vehicle that does not require human input. In some embodiments, the movable object can be mounted on a living subject, such as a human or an animal. Suitable animals can include avians, canines, felines, equines, bovines, ovines, porcines, delphines, rodents, or insects. In some embodiments, the movable object may be carried.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm3, 2 cm3, 5 cm3, 10 cm3, 20 cm3, 30 cm3, 40 cm3, 50 cm3, 60 cm3, 70 cm3, 80 cm3, 90 cm3, 100 cm3, 150 cm3, 200 cm3, 300 cm3, 500 cm3, 750 cm3, 1000 cm3, 5000 cm3, 10,000 cm3, 100,000 cm3, 1 m3, or 10 m3. Conversely, the total volume of the movable object may be greater than or equal to about: 1 cm3, 2 cm3, 5 cm3, 10 cm3, 20 cm3, 30 cm3, 40 cm3, 50 cm3, 60 cm3, 70 cm3, 80 cm3, 90 cm3, 100 cm3, 150 cm3, 200 cm3, 300 cm3, 500 cm3, 750 cm3, 1000 cm3, 5000 cm3, 10,000 cm3, 100,000 cm3, 1 m3, or 10 m3.

In some embodiments, the movable object may have a footprint (which may refer to the lateral cross-sectional area encompassed by the movable object) less than or equal to about: 32,000 cm2, 20,000 cm2, 10,000 cm2, 1,000 cm2, 500 cm2, 100 cm2, 50 cm2, 10 cm2, or 5 cm2. Conversely, the footprint may be greater than or equal to about: 32,000 cm2, 20,000 cm2, 10,000 cm2, 1,000 cm2, 500 cm2, 100 cm2, 50 cm2, 10 cm2, or 5 cm2.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 7:
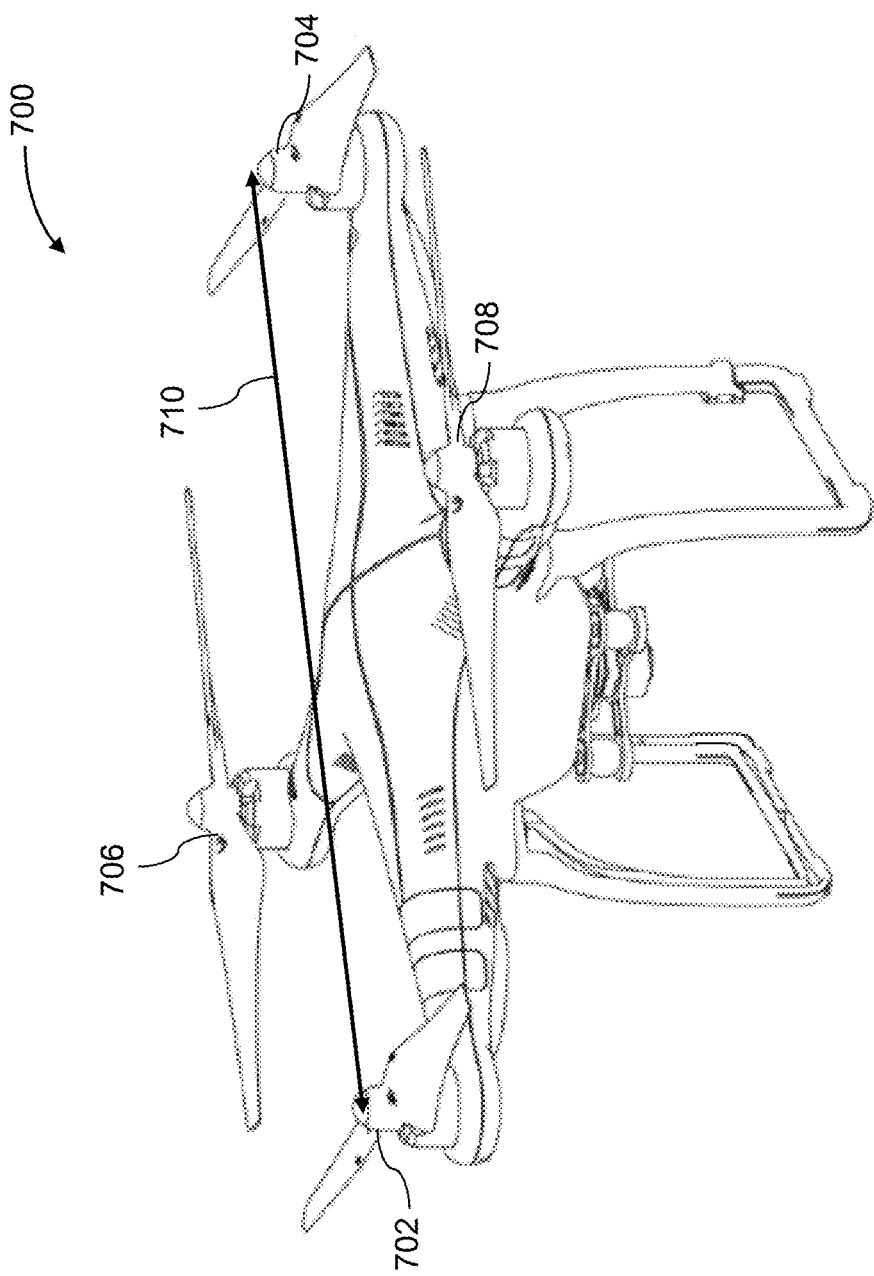
FIG. 7 illustrates an unmanned aerial vehicle (UAV), in accordance with embodiments.

FIG. 7 illustrates an unmanned aerial vehicle (UAV) 700, in accordance with embodiments. The UAV may be an example of a movable object as described herein. The UAV 700 can include a propulsion system having four rotors 702, 704, 706, and 708. Any number of rotors may be provided (e.g., one, two, three, four, five, six, seven, eight, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 710. For example, the length 710 can be less than or equal to 2 m, or less than equal to 5 m. In some embodiments, the length 710 can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 8:
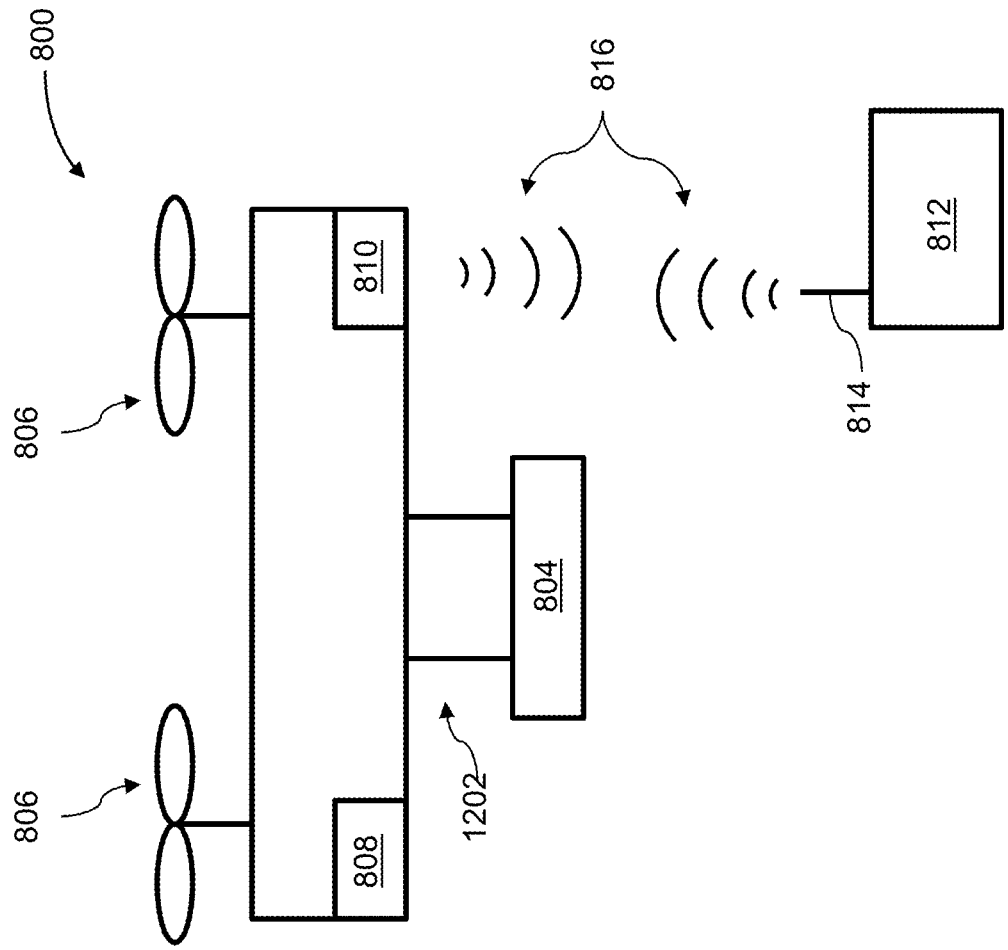
FIG. 8 illustrates a movable object including a carrier and a payload, in accordance with embodiments.

FIG. 8 illustrates a movable object 800 including a carrier 802 and a payload 804, in accordance with embodiments. Although the movable object 800 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 804 may be provided on the movable object 800 without requiring the carrier 802. The movable object 800 may include propulsion mechanisms 806, a sensing system 808, and a communication system 810.

The propulsion mechanisms 806 can include one or more of rotors, propellers, blades, engines, motors, wheels, axles, magnets, or nozzles, as previously described. For example, the propulsion mechanisms 806 may be rotor assemblies or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 806 can be mounted on the movable object 800 using any suitable means, such as a support element (e.g., a drive shaft) as described elsewhere herein. The propulsion mechanisms 806 can be mounted on any suitable portion of the movable object 800, such on the top, bottom, front, back, sides, or suitable combinations thereof.

In some embodiments, the propulsion mechanisms 806 can enable the movable object 800 to take off vertically from a surface or land vertically on a surface without requiring any horizontal movement of the movable object 800 (e.g., without traveling down a runway). Optionally, the propulsion mechanisms 806 can be operable to permit the movable object 800 to hover in the air at a specified position and/or orientation. One or more of the propulsion mechanisms 800 may be controlled independently of the other propulsion mechanisms. Alternatively, the propulsion mechanisms 800 can be configured to be controlled simultaneously. For example, the movable object 800 can have multiple horizontally oriented rotors that can provide lift and/or thrust to the movable object. The multiple horizontally oriented rotors can be actuated to provide vertical takeoff, vertical landing, and hovering capabilities to the movable object 800. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 800 (e.g., with respect to up to three degrees of translation and up to three degrees of rotation).

The sensing system 808 can include one or more sensors that may sense the spatial disposition, velocity, and/or acceleration of the movable object 800 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 808 can be used to control the spatial disposition, velocity, and/or orientation of the movable object 800 (e.g., using a suitable processing unit and/or control module, as described below). Alternatively, the sensing system 808 can be used to provide data regarding the environment surrounding the movable object, such as weather conditions, proximity to potential obstacles, location of geographical features, location of manmade structures, and the like.

The communication system 810 enables communication with terminal 812 having a communication system 814 via wireless signals 816. The communication systems 810, 814 may include any number of transmitters, receivers, and/or transceivers suitable for wireless communication. The communication may be one-way communication, such that data can be transmitted in only one direction. For example, one-way communication may involve only the movable object 800 transmitting data to the terminal 812, or vice-versa. The data may be transmitted from one or more transmitters of the communication system 810 to one or more receivers of the communication system 812, or vice-versa. Alternatively, the communication may be two-way communication, such that data can be transmitted in both directions between the movable object 800 and the terminal 812. The two-way communication can involve transmitting data from one or more transmitters of the communication system 810 to one or more receivers of the communication system 814, and vice-versa.

In some embodiments, the terminal 812 can provide control data to one or more of the movable object 800, carrier 802, and payload 804 and receive information from one or more of the movable object 800, carrier 802, and payload 804 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 806), or a movement of the payload with respect to the movable object (e.g., via control of the carrier 802). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 808 or of the payload 804). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 812 can be configured to control a state of one or more of the movable object 800, carrier 802, or payload 804. Alternatively or in combination, the carrier 802 and payload 804 can also each include a communication module configured to communicate with terminal 812, such that the terminal can communicate with and control each of the movable object 800, carrier 802, and payload 804 independently.

In some embodiments, the movable object 800 can be configured to communicate with another remote device in addition to the terminal 812, or instead of the terminal 812. The terminal 812 may also be configured to communicate with another remote device as well as the movable object 800. For example, the movable object 800 and/or terminal 812 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 800, receive data from the movable object 800, transmit data to the terminal 812, and/or receive data from the terminal 812. Optionally, the remote device can be connected to the Internet or other telecommunications network, such that data received from the movable object 800 and/or terminal 812 can be uploaded to a website or server.

Figure 9:
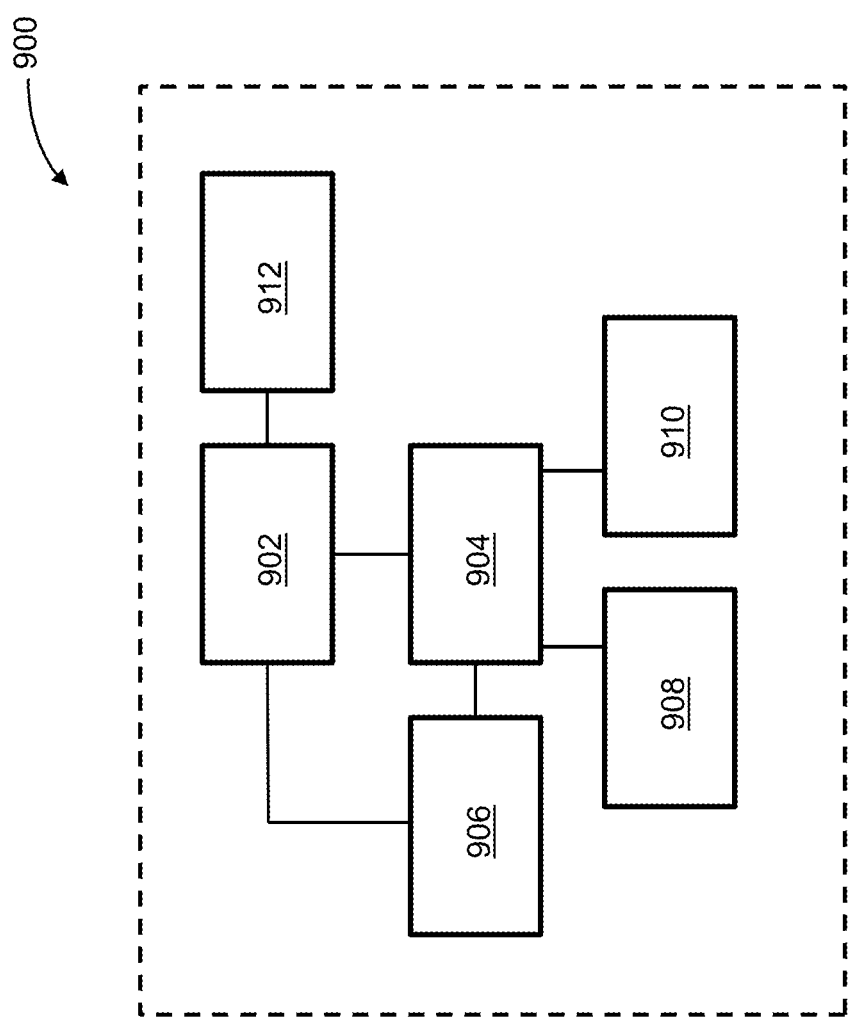
FIG. 9 illustrates a schematic illustration by way of block diagram of a system for controlling a movable object, in accordance with embodiments.

FIG. 9 is a schematic illustration by way of block diagram of a system 900 for controlling a movable object, in accordance with embodiments. The system 900 can be used in combination with any suitable embodiment of the systems, devices, and methods disclosed herein. The system 900 can include a sensing module 902, processing unit 904, non-transitory computer readable medium 906, control module 908, and communication module 910.

The sensing module 902 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 902 can be operatively coupled to a processing unit 904 having a plurality of processors. In some embodiments, the sensing module can be operatively coupled to a transmission module 912 (e.g., a Wi-Fi image transmission module) configured to directly transmit sensing data to a suitable external device or system. For example, the transmission module 912 can be used to transmit images captured by a camera of the sensing module 902 to a remote terminal.

The processing unit 904 can have one or more processors, such as a programmable processor (e.g., a central processing unit (CPU)). The processing unit 904 can be operatively coupled to a non-transitory computer readable medium 906. The non-transitory computer readable medium 906 can store logic, code, and/or program instructions executable by the processing unit 904 for performing one or more steps. The non-transitory computer readable medium can include one or more memory units (e.g., removable media or external storage such as an SD card or random access memory (RAM)). In some embodiments, data from the sensing module 902 can be directly conveyed to and stored within the memory units of the non-transitory computer readable medium 906. The memory units of the non-transitory computer readable medium 906 can store logic, code and/or program instructions executable by the processing unit 904 to perform any suitable embodiment of the methods described herein. For example, the processing unit 904 can be configured to execute instructions causing one or more processors of the processing unit 904 to analyze sensing data produced by the sensing module. The memory units can store sensing data from the sensing module to be processed by the processing unit 904. In some embodiments, the memory units of the non-transitory computer readable medium 906 can be used to store the processing results produced by the processing unit 904.

In some embodiments, the processing unit 904 can be operatively coupled to a control module 908 configured to control a state of the movable object. For example, the control module 908 can be configured to control the propulsion mechanisms of the movable object to adjust the spatial disposition, velocity, and/or acceleration of the movable object with respect to six degrees of freedom. Alternatively or in combination, the control module 908 can control one or more of a state of a carrier, payload, or sensing module.

The processing unit 904 can be operatively coupled to a communication module 910 configured to transmit and/or receive data from one or more external devices (e.g., a terminal, display device, or other remote controller). Any suitable means of communication can be used, such as wired communication or wireless communication. For example, the communication module 910 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 910 can transmit and/or receive one or more of sensing data from the sensing module 902, processing results produced by the processing unit 904, predetermined control data, user commands from a terminal or remote controller, and the like.

The components of the system 900 can be arranged in any suitable configuration. For example, one or more of the components of the system 900 can be located on the movable object, carrier, payload, terminal, sensing system, or an additional external device in communication with one or more of the above. Additionally, although FIG. 9 depicts a single processing unit 904 and a single non-transitory computer readable medium 906, one of skill in the art would appreciate that this is not intended to be limiting, and that the system 900 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 900 can occur at one or more of the aforementioned locations.

As used herein A and/or B encompasses one or more of A or B, and combinations thereof such as A and B.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of determining a position of a vehicle, said method comprising:
    receiving a plurality of images captured by one or more vision sensors, the one or more vision sensors being movable relative to the vehicle;
    selecting, with aid of one or more processors, one or more images from the plurality of images;
    determining, based on sensor data received from one or more sensors, a movement of the one or more vision sensors relative to the vehicle during the one or more images being taken;
    generating a saliency map, with aid of the one or more processors processing the one or more images by filtering according to one or more contrast features of the one or more images and compensating the movement of the one or more vision sensors relative to the vehicle;
    measuring, with aid of the one or more processors, a gradient of a gray level for each pixel in one or more portions of the saliency map;
    identifying, with aid of the one or more processors, a plurality of stationary salient features in the saliency map according to the gradient, wherein the plurality of stationary salient features are substantially stationary within an environment;
    calculating, with aid of the one or more processors, a distance from the vehicle to each of the plurality of stationary salient features; and
    determining, with aid of the one or more processors, a position of the vehicle based on the distance from the vehicle to each of the plurality of stationary salient features.

2. The method of claim 1, wherein the step of identifying the plurality of stationary salient features includes (1) identifying, with aid of one or more processors, a plurality of salient features in the saliency map according to the gradient; and (2) identifying, with aid of the one or more processors, the plurality of stationary salient features from the plurality of salient features.

3. The method of claim 2, wherein the plurality of salient features are identified when the gradient of the gray level of one or more pixels exceeds a threshold.

4. The method of claim 2, wherein the plurality of stationary salient features are identified when there is no positional change for the plurality of salient features in consecutive frames in the plurality of images.

5. The method of claim 4, wherein positions of the plurality of salient features in the consecutive frames are countervailed with one or more of the following: (1) displacement of the vehicle, or (2) displacement of a carrier that supports the one or more vision sensors relative to a body of the vehicle.

6. The method of claim 1, wherein the plurality of stationary salient features are a plurality of objects or a plurality of salient regions.

7. The method of claim 1, wherein the one or more vision sensors include one or more of the following: monocular sensor, RGB sensor, and binocular sensor.

8. The method of claim 1, further comprising determining a virtual coordinate in a local coordinate system for each stationary salient feature with the vehicle as the origin of the local coordinate system.

9. The method of claim 8, wherein the virtual coordinate of the stationary salient feature is at a center of the stationary salient feature or a center of mass of the stationary salient feature.

10. The method of claim 8, wherein the local coordinate system is a two-dimensional coordinate system.

11. The method of claim 1, wherein calculating the distance is performed by measuring a depth of the stationary salient features according to a parallax.

12. The method of claim 11, wherein the parallax is observed in consecutive frames in the plurality of images.

13. The method of claim 1, wherein the plurality of images are captured during movement of the vehicle.

14. The method of claim 1, wherein the plurality of images are two or more images captured with a different field of view.

15. An apparatus for determining a position of a vehicle, said apparatus comprising:
   one or more vision sensors configured to capture a plurality of images and being movable relative to the vehicle; and
   one or more processors individually or collectively configured to:
      select one or more images from the plurality of images;
      determine, based on sensor data received from one or more sensors, a movement of the one or more vision sensors relative to the vehicle during the one or more images being taken;
      process the one or more images by filtering according to one or more contrast features of the one or more images to generate a saliency map and compensating the movement of the one or more vision sensors relative to the vehicle;
      measure a gradient of a gray level for each pixel in one or more portions of the saliency map;
      identify a plurality of stationary salient features in the saliency map according to the gradient, wherein the plurality of stationary salient features are substantially stationary within an environment;
      calculate a distance from the vehicle to each of the plurality of stationary salient features; and
      determine a position of the vehicle based on the distance from the vehicle to each of the plurality of stationary salient features.

16. The apparatus of claim 15, wherein the vehicle is an unmanned aerial vehicle (UAV).

17. The apparatus of claim 15, wherein the one or more processors are configured to identify the plurality of stationary salient features by obtaining salient features from the saliency map and identifying the plurality of stationary salient features from the salient features.

18. A method of determining a position of a vehicle, said method comprising:
   receiving a plurality of images captured by one or more vision sensors;
   selecting, with aid of one or more processors, one or more images from the plurality of images;
   generating a saliency map, with aid of the one or more processors processing the one or more images by filtering according to one or more contrast features of the one or more images;
   determining a plurality of stationary salient feature candidates in the saliency map;
   generating a bounding box for each of the stationary salient feature candidates in the saliency map, the bounding box including a triangle shape and encompassing the corresponding stationary salient feature candidate;
   measuring, with aid of the one or more processors, a gradient of a gray level for each pixel in the bounding box for each of the stationary salient feature candidates in the saliency map;
   identifying, with aid of the one or more processors, a plurality of stationary salient features in the saliency map according to the gradient, wherein the plurality of stationary salient features are substantially stationary within an environment;
   calculating, with aid of the one or more processors, a distance from the vehicle to each of the plurality of stationary salient features; and
   determining, with aid of the one or more processors, a position of the vehicle based on the distance from the vehicle to each of the plurality of stationary salient features.

19. The method of claim 1, further comprising:
   determining a plurality of stationary salient feature candidates in the saliency map; and
   generating a bounding box for each of the stationary salient feature candidates in the saliency map, the bounding box including a triangle shape and encompassing the corresponding stationary salient feature candidate,
   wherein the one or more portions of the saliency map includes a portion encompassed by each of the bounding boxes.

20. The apparatus of claim 15, wherein the one or more processors are further configured to:
   determine a plurality of stationary salient feature candidates in the saliency map; and
   generate a bounding box for each of the stationary salient feature candidates in the saliency map, the bounding box including a triangle shape and encompassing the corresponding stationary salient feature candidate,
   wherein the one or more portions of the saliency map includes a portion encompassed by each of the bounding boxes.

* * * * *